# United States Patent
Goldshtein et al.

(10) Patent No.: US 7,531,579 B2
(45) Date of Patent: May 12, 2009

(54) METHOD OF MAKING AND USING SORBENT AND FILTERING MATERIAL FROM SECONDARY WASTE RUBBER

(75) Inventors: Vadim Goldshtein, Har Hevron (IL); Michael Kopylov, Beer-Sheva (IL); Moses Gutman, Jerusalem (IL)

(73) Assignee: ECSER Rubber, Inc., Wilmington, DE (US)

(*) Notice: Subject to any disclaimer, the term of this patent is extended or adjusted under 35 U.S.C. 154(b) by 317 days.

(21) Appl. No.: 11/473,541

(22) Filed: Jun. 22, 2006

(65) Prior Publication Data

US 2007/0299149 A1 Dec. 27, 2007

(51) Int. Cl.
*C08J 11/04* (2006.01)

(52) U.S. Cl. .............................. 521/41; 521/40; 521/43; 23/313 R; 152/450

(58) Field of Classification Search .................... 521/40, 521/40.5, 41, 43, 43.5, 48, 48.5; 524/59, 524/62; 23/313 R; 152/450, 527
See application file for complete search history.

(56) References Cited

U.S. PATENT DOCUMENTS 3,567,660 A * 3/1971 Winkler ..................... 521/44.5
4,039,489 A 8/1977 Fletcher et al.
4,116,895 A * 9/1978 Kageyama et al. .......... 524/574
5,180,704 A 1/1993 Reindl et al.
5,972,470 A 10/1999 Engst
6,110,863 A 8/2000 Engst
6,313,212 B1 * 11/2001 Caretta et al. ............... 524/493
6,387,966 B1 5/2002 Goldshtein et al.
6,541,526 B1 4/2003 Goldshtein et al.

FOREIGN PATENT DOCUMENTS

EP 0690091 B1 9/1999

* cited by examiner

*Primary Examiner*—Irina S Zemel
*Assistant Examiner*—Frances Tischler
(74) *Attorney, Agent, or Firm*—Steven Horowitz

(57) ABSTRACT

A method of making a sorbent from waste rubber and a method of sorbing oil using such sorbent. Approximately two pounds of modifier is added to 100 pounds of vulcanized rubber waste, the modifier comprising a mixture by weight of (i) a slightly water-soluble organic acid having a melting point of 70° C. or higher representing 80%, (ii) quinine group bases representing 19% and (iii) 1% of an anti sliding ingredient such as colophony, running the mixture of rubber waste and modifier in a roll mill approximately six times to crush it and placing the crushed modified rubber particles in an extruder for 2-10 minutes at 120-150° C. The sorbent can then be applied to oil to sorb six times its own weight in oil. The sorbent can be re-used two more times after extracting the oil. The sorbent is also effective at filtering oil from water.

38 Claims, 1 Drawing Sheet

METHOD OF MAKING AND USING SORBENT AND FILTERING MATERIAL FROM SECONDARY WASTE RUBBER

FIELD OF THE INVENTION

The present invention is related to the field of ecology and more particularly to cleaning up oil spills and filtering water from mixtures containing oil with other materials.

BACKGROUND OF THE INVENTION AND DISCUSSION OF THE PRIOR ART

The present invention provides an efficient and cost-effective solution for two serious ecological problems. The first problem is water and earth pollution due to the accidental and inevitable operational spills of oil products. The second one is the accumulation of waste rubber tires. Using the below-referenced multi-directional method of waste tire rubber de-vulcanization process, a product has been identified exhibiting a high degree of sorbing of oil product.

Throughout this patent application the term "sorb" or "sorbing" is used to encompass both absorption and/or adsorption. Although absorption and absorbability are this not synonymous with sorbing and ability to sorb, the term "absorbability" and "absorption" as used in the tables are used to indicate ability to sorb.

The methods of manufacturing oil product absorbents from secondary rubber are well-known. U.S. Pat. No. 3,567,660 proposes to use crushed rubber of waste tires. The absorption of oil products occurs due to swelling of rubber. However, swelling of vulcanized rubber with a dense molecular space grid is known to be insignificant. This factor has been taken into account by U.S. Pat. No. 4,039,489, which suggests specially synthesizing a polymer with the minimum number of lateral bonds in order to maximize the polymer swelling capability. The obvious drawback of this method is its inefficiency, because it requires a new polymer material to be synthesized instead of making use of abundant secondary raw material. In addition, the ecological problem associated with the accumulation of waste tires would also still remain unsolved.

The degree of oil product absorption is determined not only by the swelling capability of the material since the swelling capability is itself determined by the structure of the material. In the process of collecting the oil, the material of the absorbent acts as a system of particles linked together, rather than the system of isolated particles. Therefore, the role of structures formed by these particles, i.e., that of agglomerates, is no less, and maybe, more, important. In this situation, first of all, the selective capillary effect becomes apparent. The liquid wetting the walls of capillary (in our case, oil or any petroleum based product) enters the space between the particles, whereas the non-wetting liquid (in our case, water) does not enter such space.

Technical solutions to creating an effective srobents from waste rubber using the selective capillary absorption of oil products, e.g., U.S. Pat. No. 5,180,704, are well known. To increase the inter-particle adhesion, the authors propose to modify a part of the rubber crumb surface by means of de-vulcanization. As a result, the particles adhered to one another form a capillary system. The selective capillary mechanism is proposed in a number of other works, e.g., U.S. Pat. Nos. 4,039,489, 5,972,470, 6,110,863, where a wide variety of powder- and fiber-like materials of different origin, including fibrous polypropylene and industrial wastes, are used as sorbents.

All of these methods have proved to be insufficiently effective due to drawbacks inherent to the capillary mechanism of absorption. First, the capillary effect strongly depends on the viscosity of product being absorbed, which, in turn, depends on the ambient temperature. On the surface of large water basins, where oil spills take place, the temperature is relatively low; therefore, the product viscosity increases, and the rate of absorption decreases. Second, when removing the bulk of sorbent along with the absorbed oil from water, the capillary structure is disrupted, and ceases to hold oil products.

Thus, the oil sorbing process can be implemented by different mechanisms at different levels: (a) swelling determined by the macromolecular structure (chain length) and cross-linking of macromolecules (vulcanization grid); (b) surface absorption, which depends on surface branching, in particular, on the size of particles; and (c) capillary absorption at the level of material particle system determined by the particle set structure. In sum, the particulate material used for oil absorption achieves the absorption by allowing the oil products to be absorbed inside the particles, on the surface of the particles, and in the interstitial spaces between particles.

Therefore, there is compelling need to try to create a system, which could make use of all three oil product collection mechanisms simultaneously. Waste rubber crumb conglomerations, as described in the above-mentioned patents, fully enable only two of the three mechanisms, namely those of surface absorption and capillary absorption. Conceptually, the third mechanism, swelling, can be enabled by rubber de-vulcanization.

The known methods of waste tire rubber de-vulcanization are described, e.g., in European Patent no. EP 0690091 to Sekhar et al. The drawback of this method consists, first of all, in that it gives a paste-like output product due to the use of liquid, plastic, and/or softening substances like diols, stearic acid, natural rubber, etc. as modifying de-vulcanization agent components. The product having this physical form cannot be dispersed over the surface of the water, earth, etc. Therefore, a requirement for the waste rubber processing technology is that it provide a definite physical consistency of the product in order to be suitable for use in oil product absorption.

Another known rubber de-vulcanization method is that described in U.S. Pat. No. 6,541,526. In the technology described in this patent, a powder-like modifier is used for the de-vulcanization of secondary rubber. Disintegrated rubber is subjected to thermomechanical treatment in roll mills in the presence of modifier. The final product of this process, completely de-vulcanized rubber, also does not meet the above-described physical consistency requirement for an effective sorbent.

As indicated, there is a compelling need to develop a method of manufacturing an efficient oil product sorbent that can fully and successfully make use of all three oil absorption mechanisms: namely, swelling, surface absorption, and capillary absorption. Ideally, such a method should also be capable of solving a pressing ecological problem, the accumulation of waste rubber from rubber tires, by using waste rubber from the accumulated rubber tires as its raw material.

SUMMARY OF THE PRESENT INVENTION

Oil spills in open water basins may amount to as much as tens of thousands of tons per accident. The amount of sorbent required to sorb the oil in such spills is also correspondingly high. The oil collection problem is governed mainly by ecological considerations. However, the cost factor is of importance as well. It is natural, therefore, that attention is called to a material like waste tire rubber. In many countries, the collection, utilization, and recycling of old rubber tires are regulated by national legislation. Within the framework of these regulations, a substantial part of waste rubber is crushed and added to fresh rubber or asphalt mixtures, or to traditional fuels. However, due to a relatively high cost of rubber tire crushing ($50 to $250 per ton, depending on the size of rubber crumb produced) these processes can be implemented only on condition that state subsidies are granted. Fresh rubber mixtures cannot be doped with more than 10% of rubber crumb without a deterioration of the mechanical properties of the rubber articles produced. Rubber crumb used as an addition to the main fuel is possible for cement kilns only, because burning rubber releases gaseous sulfur compounds, nitrogen and chlorine compounds, and extremely toxic dioxins. Cement clinker sorbs the major part of these gases.

In the last few years, considerable interest has been demonstrated in the development of post-de-vulcanization technologies of application of secondary rubber. However, a relatively low reclaim quality also restricts a wide application of rubber crumb as an additive in the production of rubber articles. Therefore, the development of new applications for rubber reclaim has become important, particularly those where the "rubber" properties of the reclaim are less important than other characteristics.

The authors of the present invention have proposed a partial rubber-de-vulcanization technology, whose final product is a highly efficient hydrocarbon sorbent. This technology provides for the partial directional destruction of the rubber vulcanization grid, thus producing a product featuring a high sorption capacity.

The dissolution of polymers, in particular, rubber polymers, in solvents including oil and oil products proceeds in two stages. First, solvent molecules penetrate into the polymer, draw apart macromolecules, and become fixed inside the polymer matrix by physical (non-chemical) links. This is the swelling stage. After a substantially strong swelling of the polymer, the separation of polymer macromolecules from the main bulk of material begins, and macromolecules start transferring to the solution. This is just the stage of direct dissolution of polymer. It occurs if the chemical grid of the polymer is destroyed. Therefore, the dissolution of rubber in the oil product is possible only if the de-vulcanization was substantially deep and complete. On the other hand, in the case of dense vulcanization grid, the swelling of polymer will be low, i.e., no significant quantity of hydrocarbons will enter inside the polymer.

Therefore, to solve the problem of creating an efficient oil product sorbent, chemical reagents and tire rubber de-vulcanization conditions should be selected providing, on the one hand, for the maximum swelling of weakly cross-linked rubber polymer grid in oil products and, on the other hand, for this grid to be sufficiently strong for not to collapse under swelling and not to dissolve in the oil product.

In this case, the most appropriate technology of crushed tire rubber de-vulcanization is that described in U.S. Pat. No. 6,541,526. According to this technology, " . . . the modifying composition is a mixture of (1) a proton donor that selectively breaks the sulfur bonds and renders the sulfur passive, (2) an organic acid that activates new bonds between macromolecules for later revulcanization, and (3) a friction agent that prevents sliding of the waste rubber between rollers of the roll mills. The particles are subjected to at least ten pairs of rollers in at least ten roll mills, examined for consistency and subjected to further sets of roll mills if necessary. It should be understood that a single multi roll mill shall be understood as comprising separate roll mills for each pair of rollers in the multi roll mill. The composition selectively breaks the sulfur to sulfur bonds while allowing the carbon to carbon bonds to remain intact thereby maintaining the integrity of the rubber macromolecules."

As stated, however, if the method of crushed tire rubber de-vulcanization described in U.S. Pat. No. 6,541,526 were to be used then the resulting de-vulcanized rubber would not have the consistency that is suitable for oil sorbing. This is because there will have been too much vulcanization. Accordingly, the method of the present invention has found an ingenious way of making use of only two of the five components of this patent to sorb oil and filter water.

Oil spillage presents an ecological problem while oil spill cleanup is a financial problem. Therefore it is ideal for the industry to look towards inexpensive yet effective cleanup materials. The present invention uses waste tires to solve these problems and achieve remarkable results using waste tire rubber as an oil absorption agent.

The method of the present invention allows targeted destruction of the rubber vulcanization grid creating a substance with a high absorption capacity. The method of the present invention also ingeniously satisfies the requirement that the sorbent be protected from dissolving in the oil spill. As noted, the dissolution of a rubber polymer in oil or any solvent occurs in two stages; initially the solvent molecules penetrate into the polymer, draw apart the polymer macromolecules, and become fixed inside the polymer matrix by physical (i.e. non-chemical) bonds. This is commonly referred to as the swelling stage. After substantial swelling occurs the polymer macromolecules may start to separate and transfer to the solvent where they may dissolve completely. This is called the dissolution stage. Dissolution can generally occur only if the vulcanization cross links are thoroughly destroyed and the de-vulcanization is complete. Rubber polymers with a dense vulcanization grid can only allow minimal swelling so no significant quantity of oil can enter the polymer.

The challenge is to subject the rubber to a de-vulcanization regime that will produce a substance capable of maximum swelling yet maintaining sufficient cross links to prevent the rubber from dissolving in oil. The present invention is able to achieve precisely those conditions by creating a substance capable of significant swelling and with a high absorption capacity and with a very low cost.

A method of making and using a sorbent and filtering material from waste rubber comprises adding a modifier to vulcanized rubber wastes, the modifier comprising a mixture of. Approximately two pounds of modifier is added to 100 pounds of vulcanized rubber waste, the modifier comprising a mixture by weight of (i) a slightly water-soluble organic acid having a melting point of 70 degrees C. or higher representing about 70 to 90% and most preferably 80%, (ii) quinine group bases representing approximately 9 to 29% and most preferably 19% and (iii) between three quarters of 1% and 1 and a quarter percent of an anti sliding ingredient, colophony or terpene, running the mixture of rubber waste and modifier in a roll mill three to ten times and ideally six times to crush it and then placing the crushed modified rubber particles in an extruder for 2 to 10 minutes at 120-150 degrees C. The resulting partially de-vulcanized rubber is a remarkably effective sorbent that can then for example be applied to oil in an oil spill on land or in the water and the sorbent sorbs the oil and thereby cleans up the oil spill. When the sorbent is applied to oil it sorbs six times its own weight in oil. The sorbent can be re-used two more times after extracting the oil. The sorbent is also effective at filtering oil and other contaminants from water, including contaminants in the form of solid particles.

OBJECTS AND ADVANTAGES

The following objects and advantages may be present in certain embodiments of the present invention:

(1) to provide a method of manufacturing a product that can both sorb oil effectively and also filter water;

(2) to provide a method of making a sorbent that is reusable;

(3) to provide such a method of making a reusable sorbent that can be separated from the oil it sorbed and then re-used two additional times;

(4) to provide such a method that uses rubber crumb as its raw material;

(5) to provide such a method that solves the pressing ecological problem of the accumulation of rubber from rubber tires;

(6) to provide a method of making a sorbent that sorbs by utilizing the mechanisms of swelling, surface absorption and capillary absorption;

(7) to provide such a method that treats the rubber raw material used in the method with chemical, mechanical and thermal exposure;

(8) to provide a method of making a sorbent that pops the rubber crumb particles so that the particles are capable of absorbing oil into the inside space of the particle;

(9) to provide a method of making a sorbent out of rubber;

(10) to provide a method of making a sorbent that can sorb approximately six times its own weight in oil;

(11) to provide a method of making an oil sorbent from rubber crumb that achieves a sorbing capacity of approximately six times its own weight in oil in comparison with an oil sorbing capability of its raw material, the rubber crumb, of only 1 and a half to 2 times its weight in oil;

(12) to provide a method of making a sorbent that can sorb a higher proportion of its weight than prior art sorbents;

(13) to provide such a method that employs mechanical crushing between roll mills that effectuates just the right amount of a partial de-vulcanization of the rubber so as to allow the sorbent to allow swelling during the sorbing process without dissolving in the oil;

(14) to provide such a method wherein the resulting rubber sorbent has not been so de-vulcanized that it will dissolve in oil when you try to use it as a oil sorbent;

(15) to provide such a method wherein the rubber sorbent while not overly de-vulcanized, has been sufficiently de-vulcanized that when used as a sorbent it can allow a substantial amount of swelling to take place;

(16) to provide a method of making an oil sorbent that does not cost as much as prior art sorbents;

(17) to provide a method of sorbing oil from oil spills;

(18) to provide a method of sorbing oil that also significantly reduces the amount of waste rubber polluting the environment;

(19) to provide a method of sorbing oil that can be used for oil located on land and for oil located on or in water;

(20) to provide a method of sorbing oil that does not require placing the sorbent into shells or mats; and

(21) to provide a method of sorbing oil that is less expensive than prior art methods of sorbing oil.

DETAILED DESCRIPTION OF THE PREFERRED EMBODIMENT

Figure 1:
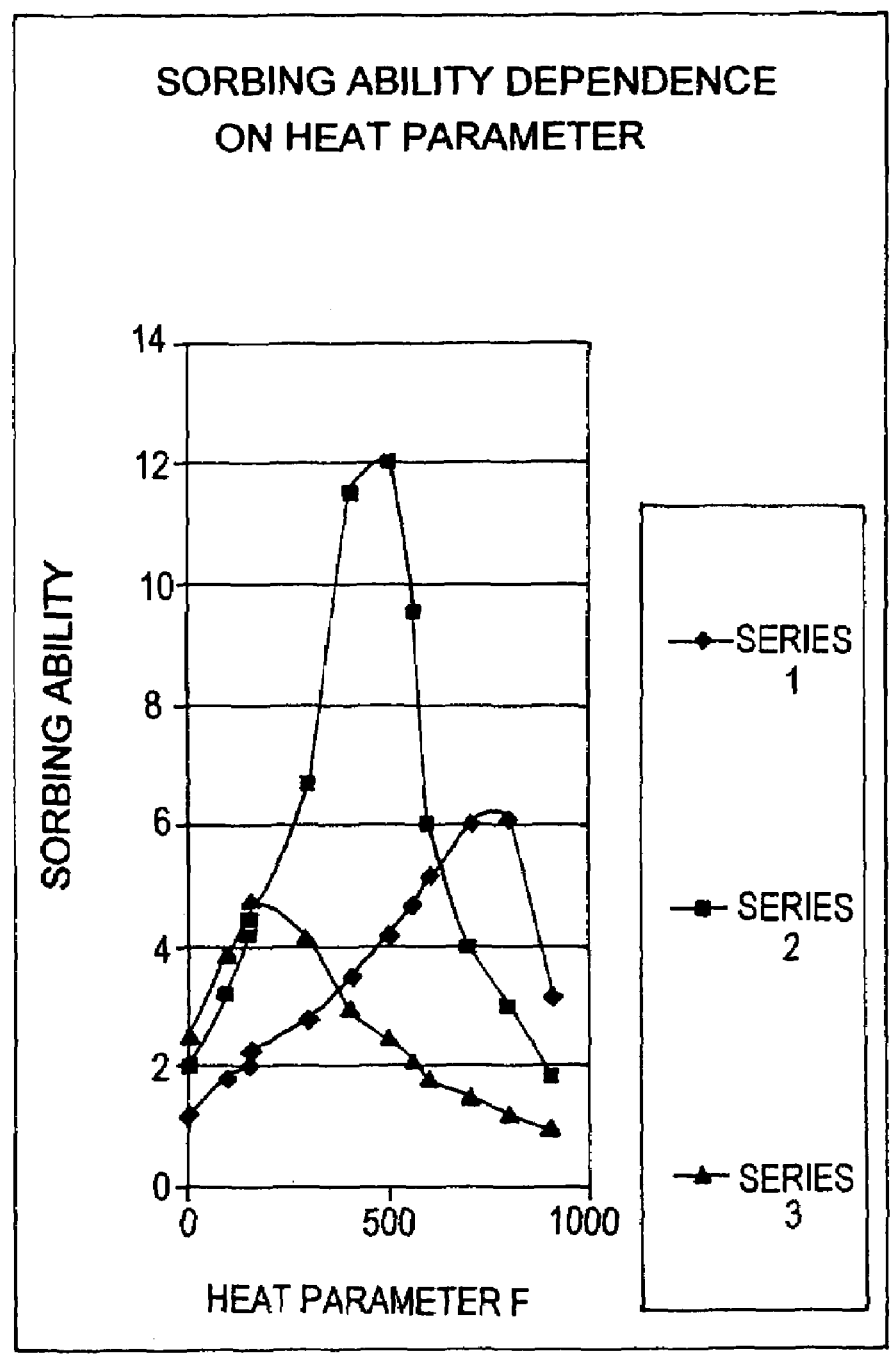
FIG. 1 is a graphic representation of the dependence of the sorbing capacity of the sorbent on the heat parameter for three different modifier-percentage amounts (series 1 which is 0.5%, series 2 which is 2%, series 3 which is 2.5%).

The technological process according to the present invention is as follows. A raw stock for the manufacture of oil product sorbent is rubber crumb produced from waste tire and other rubber articles. Thus the raw material is vulcanized waste rubber or vulcanized rubber. The maximum size of crumb is determined by equipment parameters and, typically measures approximately 1 to 2 cm.

The first step in the process is to mix the waste rubber crumb with a modifier. The mixing is a simple mechanical mixing and can in theory be done manually. The modifier itself is comprised of a mixture of (i) slightly water-soluble organic acids with a melting point at least 70 degrees C., (ii) quinone group bases, the acid to base ratio being within the range of 3:1 to 10:1, and (iii) either a terpene or colophony. The optimum result is reached when this ratio is in the range of 4:1 to 6:1.

If adding a terpene, it is preferable to add a solid terpene. In a preferred embodiment, colophony (the solid portion of terpene or wood resin), rather than a terpene, is added. The purpose of adding approximately 1% of terpene or colophony is to prevent sliding of solid rubber on the steel surfaces of the rollers of the roll mill, in the later step, as described below.

In a most preferred embodiment, the proportion of ingredients in the mixture is approximately 80 percent slightly water-soluble organic acid, approximately 19 percent quinine group bases and approximately 1 percent wood resin. In a preferred embodiment, the range of proportions in the mixture by weight is (i) the slightly water-soluble organic acid having a melting point of at least 70 degrees C. representing between approximately 70 percent and approximately 90 percent of the mixture, (ii) the quinine group bases representing between approximately 9 and approximately 29 percent of the mixture and (iii) the wood resin representing between approximately three quarters and approximately 1 and a quarter percent of the mixture. In a more preferred embodiment, the range of proportions in the mixture by weight is (i) the slightly water-soluble organic acid having a melting point of at least 70 degrees C. representing between approximately 78 percent and approximately 82 percent of the mixture, (ii) the quinine group bases representing between approximately 17 and approximately 21 percent of the mixture and (iii) the wood resin representing between approximately three quarters and approximately 1 and a quarter percent of the mixture.

The following chart/table illustrates the resulting oil absorption with varying amounts of modifier percentage, acid to base ratio, number of passes by the roll mill, extruder temperature, time in the extruder and heating parameter F:

| Sample # | Modifier amount, % | Organic acid to base ratio | Passes by roll mill | Extruder temperature, C. | Time in extruder, min | Heating parameter, F. | Oil absorbtion, weight/weight |
| --- | --- | --- | --- | --- | --- | --- | --- |
| 1 | 0.5 | 3 | 3 | — | — | 0 | 1.2 |
| 2 | 0.5 | 3 | 3 | 200 | 1 | 100 | 1.8 |
| 3 | 0.5 | 3 | 3 | 175 | 2 | 150 | 2 |
| 3 | 0.5 | 3 | 3 | 180 | 2 | 160 | 2.3 |
| 4 | 0.5 | 3 | 3 | 150 | 6 | 300 | 2.8 |
| 6 | 0.5 | 3 | 3 | 200 | 4 | 400 | 3.5 |
| 7 | 0.5 | 3 | 3 | 200 | 5 | 500 | 4.2 |
| 8 | 0.5 | 3 | 3 | 180 | 7 | 560 | 4.7 |
| 9 | 0.5 | 3 | 3 | 200 | 6 | 600 | 5.2 |
| 10 | 0.5 | 3 | 3 | 200 | 7 | 700 | 6 |
| 11 | 0.5 | 3 | 3 | 200 | 8 | 800 | 6.1 |
| 12 | 0.5 | 3 | 3 | 200 | 9 | 900 | 3.2 |
| 13 | 2 | 5 | 10 | — | — | 0 | 2 |
| 24 | 2 | 5 | 10 | 200 | 1 | 100 | 3.2 |
| 25 | 2 | 5 | 10 | 150 | 3 | 150 | 4.2 |
| 26 | 2 | 5 | 10 | 180 | 2 | 160 | 4.5 |
| 27 | 2 | 5 | 10 | 200 | 3 | 300 | 6.7 |
| 28 | 2 | 5 | 10 | 200 | 4 | 400 | 11.5 |
| 29 | 2 | 5 | 10 | 200 | 5 | 500 | 12 |
| 30 | 2 | 5 | 10 | 180 | 7 | 560 | 9.5 |
| 31 | 2 | 5 | 10 | 200 | 6 | 600 | 6 |
| 32 | 2 | 5 | 10 | 200 | 7 | 700 | 4 |
| 33 | 2 | 5 | 10 | 180 | 10 | 800 | 3 |
| 34 | 2 | 5 | 10 | 190 | 10 | 900 | 1.8 |
| 35 | 1.1 | 6 | 10 | — | — | 0 | 1.7 |
| 36 | 1.5 | 10 | 5 | — | — | 0 | 1.3 |
| 37 | 1.5 | 5 | 10 | — | — | 0 | 1.4 |
| 38 | 1.5 | 4.4 | 20 | 130 | 2 | 60 | 5.7 |
| 39 | 2 | 6 | 10 | 150 | 5 | 250 | 7.3 |
| 40 | 1.7 | 6 | 10 | 180 | 10 | 800 | 5.6 |
| 41 | 0.8 | 6 | 10 | 200 | 7 | 700 | 5.5 |
| 42 | 1.3 | 6 | 20 | 180 | 6 | 480 | 6.1 |
| 43 | 2.5 | 5 | 10 | — | — | 0 | 2.5 |
| 44 | 2.5 | 5 | 10 | 200 | 1 | 100 | 3.9 |
| 45 | 2.5 | 5 | 10 | 175 | 2 | 150 | 4.5 |
| 46 | 2.5 | 5 | 10 | 180 | 2 | 160 | 4.8 |
| 47 | 2.5 | 5 | 10 | 150 | 6 | 300 | 4.2 |
| 48 | 2.5 | 5 | 10 | 200 | 4 | 400 | 3 |
| 49 | 2.5 | 5 | 10 | 200 | 5 | 500 | 2.5 |
| 50 | 2.5 | 5 | 10 | 180 | 7 | 560 | 2.1 |
| 51 | 2.5 | 5 | 10 | 200 | 6 | 600 | 1.8 |
| 52 | 2.5 | 5 | 10 | 200 | 7 | 700 | 1.5 |
| 53 | 2.5 | 5 | 10 | 200 | 8 | 800 | 1.2 |
| 54 | 2.5 | 5 | 10 | 200 | 9 | 900 | 1 |

The following chart presents the data shown graphically in FIG. 1 between the heating parameter F and the resulting ability to sorb oil (imprecisely called "oil absorption") for three different "% of modifier" parameters:

| Heating parameter F. | Oil absorption, weight/weight, 0.5% of modifier, series 1 | Oil absorption, weight/weight, 2% of modifier, series 2 | Oil absorption, weight/weight, 2.5% of modifier, series 3 |
| --- | --- | --- | --- |
| 0 | 1.2 | 2 | 2.5 |
| 100 | 1.8 | 3.2 | 3.9 |
| 150 | 2 | 4.2 | 4.5 |
| 160 | 2.3 | 4.5 | 4.8 |
| 300 | 2.8 | 6.7 | 4.2 |
| 400 | 3.5 | 11.5 | 3 |
| 500 | 4.2 | 12 | 2.5 |
| 560 | 4.7 | 9.5 | 2.1 |
| 600 | 5.2 | 6 | 1.8 |
| 700 | 6 | 4 | 1.5 |
| 800 | 6.1 | 3 | 1.2 |
| 900 | 3.2 | 1.8 | 1 |

With respect to notation, it is noted for charts in this patent application that the decimal point has sometimes been replaced by a comma, as in "2,5" rather than "2.5".

The ratio by weight of the modifier to the rubber crumb to which said modifier is added is approximately 1 to 50. That is, the ideal proportion is approximately 2 pounds of modifier added to every 100 pounds of rubber crumb. In a preferred embodiment, between approximately 1 and a half pounds of modifier to approximately 2 and a half pounds of modifier should be added to every 100 pounds of rubber crumb.

It should be noted that although the process of the present invention is described as using rubber crumb as its raw material, the present invention certainly contemplates using any vulcanized waste rubber as its raw material. In order to best use the method of the present invention, however, the raw material, vulcanized rubber waste, should have already been made into particles having a diameter of approximately 5 inches or less such as rubber crumb or other rubber particles. Accordingly, the term "vulcanized waste rubber" in the claims should be understood to refer to such waste rubber that is in such particulate form already, for easy mixing with the modifier of the present invention.

To ensure chemical interaction of modifier molecules with sulfur links located not only at the surface, but at depth of rubber crumbs, shear deformation is created within the crumbs. The deformation results in stretching sulfur links between macromolecules, which facilitates attacking these links by active radicals formed from the modifier components. At the same time, rubber crumb is additionally crushed, new surfaces are exposed, and crumbs are continuously mixed with the modifier. The deformation can be implemented by various methods, but most convenient and appropriate for this purpose are mixing rolls representing standard equipment used in chemical industry. Naturally, the choice of rolls size for the industrial manufacture of sorbent depends first of all on the yield required. In our experiments, rolls 30 in length and 15 cm in diameter were used. The linear velocity of the slow roll was 3-5 m/min and that of the fast one 5-10 m/min. The gap between rolls was 0.1-0.5 mm. The best results were obtained with a gap of 0.1-0.15 mm. Due to the special design of the rolls, the mixture is heated in the course of treatment.

The above-mentioned mixture of rubber crumb and modifier is passed through the moving rolls of the roll mill between 3 to 10 times at a temperature of 20 to 50 degrees C. In a preferred embodiment, the above-mentioned mixture of rubber crumb and modifier is passed through the moving rolls of the roll mill 6 times.

The factors considered above impose certain limitations on physical consistency of chosen modifier components (the reactivity parameters being at optimum). For example, these components may not produce slipping at both ambient temperature and in the case of melting due to frictional heating of the material. Otherwise, rubber crumb would not experience shear when passing through the rolls. Particular modifier components selected from aromatic substituted acids for our experiments (benzoic acid and anthraquinone) meet the above requirements. To increase friction between the rubber crumb and rolls, the composition may be doped with a small quantity of ground colophony, up to 5% of modifier weight. Rubber crumb received from different sources may somewhat differ in properties; this would require certain, though very limited, correction of process parameters like the temperature, gap between rolls, etc.

Based on experiments, it has been found that the friction between the rolls of the roll mill should be set at between approximately 1.4 and approximately 1.5 "ratio", where the "ration" is the ratio of the rotations per minute of one roll of the roll mill to the rotations per minute of the other roll of the roll mill. If the friction is set at greater or less than these parameters, then the result is significantly poorer in terms of its effectiveness as a sorbent.

After treatment in rolls, the material has the form of loose flakes. If prior to rolling the particles of light (almost white) powder-like modifier are clearly visible on the dark rubber crumb background, the flakes passed through the rolls should be of uniformly dark color. This evidences the penetration of modifier into and interaction with the bulk rubber. If this is not the case, the rolling should be repeated.

Of course, the secondary rubber used in the proposed method is not necessarily dark. Then, it would be difficult to use the described checking method. Note, however, that the use of black (i.e., soot-filled) rubbers is preferable, because soot itself (normally, more than 30% of tire rubber) is a good hydrocarbon sorbent. Color filling materials may be of widely varying nature. Some of them do sorb hydrocarbon, the others do not. However, soot-filled rubbers are the most widespread ones.

Oil product sorbing experiments conducted with material manufactured using the above method have revealed that the best results are achieved if, after rolling, the material is exposed to additional intense thermomechanical treatment. It increases the sorbing capability of the material by a factor of about 2 to 4, all other factors being the same. This effect can be attributed, seemingly, to the fact that heating is favorable to additional breaks of molecular chains and the increase of inter-chain spacing, which, in turn, facilitates polymer swelling in the hydrocarbon environment. It is established by experiments that the temperature of exposure should be between approximately 120 to approximately 200 degrees Centigrade and more preferably approximately 120 to 150 degrees C, and the time of exposure in the extruder should be approximately 2 to approximately 10 minutes. In our experiments, a screw extruder was used for heat treatment.

The heat effect of the extruder is determined by its temperature and passing-through time, i.e., by the extruder rotation speed.

This phenomenon was revealed unexpectedly in the course of experiments with de-vulcanized secondary rubber. Usually, additional treatment of such a material in the extruder produces paste-like mass. Under very intense heat exposure, this mass becomes resin-like and starts burning. If the case of insufficient heat exposure, the material after treatment consists of dense grains, which, moreover, may stiffen into dense agglomerations. The authors of the present invention have found that there exists a certain, rather narrow, range of secondary rubber treatment parameters giving the final product in the form of loose flakes. It is just this state of material that ensures the best sorbing capacity for all sorbing mechanisms.

Examining the sorbent particles under the microscope at a magnification of 200× allows the conclusion that all three oil product sorption mechanisms, swelling, surface absorption, and capillary absorption, were implemented:

(i) due to swelling, particles of about 0.5 in size increase to about 0.8 mm, which corresponds to macromolecular grid swelling with the about 4-fold increase of volume;
(ii) the developed surface of separate particles of the manufactured sorbent affords a high level of surface absorption; a substantial change of particle surface appearance was noted for particles getting to the hydrocarbon environment: loose and matt surface becomes smooth and glare;
(iii) sorbent particles are actively grouped into porous agglomerations intensely sorbing surrounding hydrocarbons.

The following empirical parameter F has been introduced that estimates the heat exposure of secondary rubber being treated in the extruder:

$$F = T \times (t-100)$$

where T is the time of exposure, minutes,
t is the extruder temperature, degrees C.

Experiments were conducted to determine the absorbability (i.e. ability to sorb) of the material at various values of parameter F (see Table shown in FIG. 1). Shown in FIG. 1 are the plots of material absorbability vs. heat exposure parameter F at different values of modifier weight to rubber weight ratio. These curves indicate a sharp growth of absorbability at the initial increase of parameter F value. Further increase of the heat exposure results in weakening the absorbability. The location and absolute value of the absorbability maximum vary depending on treatment conditions.

Different oil products, as well as different grades of crude oil, exhibit different physical and chemical properties and thus can be differently absorbed by the same material. Therefore, to compare the properties of sorbents, test conditions should be standardized. In this work, the absorbability was determined using winter diesel fuel at the room temperature.

Tests were also performed with other products: engine oil, crude oil, gasoline, fuel oil; the environment temperature was varied as well. More likely, the above parameters influence the rate of absorption, rather than the degree of oil product absorption. Seemingly, in this process, the viscosity of product plays the main role. At the same time, when comparing the sorbent samples manufactured under different conditions, it was noted the proportionality of absorbabilities for various products and at various temperatures. In other words, the comparative results of sorption efficiency received for diesel fuel at the room temperature are valid for other conditions as well. By this reason, further estimates of experimental data were made using diesel fuel.

The established de-vulcanization mode allows manufacturing powder-like or loose flake-like sorbent. The sorbent can be used for various purposes: (i) as filtering and/or sorbing material in facilities for the purification of water from oil products and suspensions (such facilities can be mounted both on land and on self-floating structures); in this case the sorbent is placed into cellular frame and compacted; (ii) as sorbing material for collecting oil products from the surface of water; (iii) as sorbing material for collecting oil products from solid surfaces, in particular, for cleaning the territory of gasoline stations and car washing plants.

In cases (ii) and (iii) the preferred technology consist in sorbent in crumb form scattering on cleaned liquid or solid surface and its subsequent collection. This sorbent has additional merits: it does not sink; after sorbing oil, it can be easily collected (by a vacuum cleaner from solid surface and with a fine net from water surface); it is free from toxic components, ecologically safe, and safe to handle. The sorbent can be easily recycled, i.e., its sorption properties can be regenerated by squeezing out the absorbed oil using a press, centrifuge, etc.

The proposed material requires no placing it into any shells or mats, which is the case for sorbents implementing only the capillary effect. Therefore, its application will be especially useful when eliminating spills in open sea and under substantial wave height. Due to specific weight slightly exceeding the unity, sorbent particles are not taken off by wind, at the same time, due to surface tension, they do not sink.

The proposed sorbent is a very convenient means for cleaning, e.g., garages from fuel and engine oil spills. Being scattered over the floor, it absorbs oil products almost instantly and then it can be brushed away. Collected oil products can be squeezed off with a press, after which the sorbent can be reused.

The following comparative table of different sorbents illustrates how a remarkably inexpensive and effective sorbent is produced using the method of the present invention.

| # | Absorbent name | Country | Absorbent type | Bulk density, kg/m3 | Absorption, Weight/weight | Absorption, Volume/volume | Absorbent price, $/T | Absorbent price per 1t of absorbed oil, $ |
|---|---|---|---|---|---|---|---|---|
| 1 | Sibsorbent | Russia | peat | 400 | 4 | 0.6 | 1,500 | 375 |
| 2 | Turbo Jet | France | peat | 700 | 3.6 | 0.4 | 5,800 | 1,600 |
| 3 | Peat Sorb | Canada | peat | 400 | 4 | 0.6 | 7,000 | 1,750 |
| 4 | Vivan | Russia | Spray/powder | 300-500 | 8 | 2.4 | 20,000 | 2,500 |
| 5 | Devoroil | Russia | Bio-preparative | No data | 5-8 | No data | 4,500 | 235-560 |
| 6 | Primesorb | USA | Polymer powder | No data | 37 | No data | 25,000 | 925 |
| 7 | STRG | Russia | graphite | 12 | 40-60 | 9 | 15,000 | 250 |
| 8 | Met.Polymer | Belarus | Polymer-textile | 15-20 | 20-30 | 3.3 | 1,500 | 500 |
| 9 | Spill-Cure, the method of present invention | USA | Rubber powder | 200-300 | 6 | 1 | 350 | 60 |

It is to be understood that while the method of this invention have been described and illustrated in detail, the above-described embodiments are simply illustrative of the principles of the invention. It is to be understood also that various other modifications and changes may be devised by those skilled in the art which will embody the principles of the invention and fall within the spirit and scope thereof. It is not desired to limit the invention to the exact construction and operation shown and described. The spirit and scope of this invention are limited only by the spirit and scope of the following claims.

What is claimed is:

1. A method of manufacturing an oil product sorbing and/or filtering material, comprising:
   adding a modifier to vulcanized rubber waste in a proportion of between approximately one and a half pounds to approximately two and a half pounds for each 100 pounds of vulcanized rubber waste, the modifier comprising a mixture in the following proportions by weight (i) a slightly water-soluble organic acid having a melting point of 70 degrees Centigrade or higher representing between approximately 70 percent and approximately 90 percent of the mixture, (ii) quinine group bases representing between approximately 9 and approximately 29 percent of the mixture and (iii) either a terpene or colophony, representing between approximately three quarters and approximately 1 and a quarter percent of the mixture, to obtain a mixture of rubber crumb and modifier,
   crushing the mixture of rubber waste and modifier to create crushed modified rubber particles, and
   converting the crushed modified rubber particles into porous agglomerations of modified rubber.

2. The method of claim 1, wherein the modifier comprises a mixture in the following proportions by weight (i) a slightly water-soluble organic acid having a melting point of 70 degrees Centigrade or higher representing approximately 80% of the mixture, (ii) quinine group bases representing approximately 19% of the mixture and (iii) a terpene representing approximately 1% of the mixture.

3. The method of claim 2, wherein crushing the mixture of waste rubber crumb and modifier involves placing said mixture into an area between moving rollers of a roll mill between three and ten times successively.

4. The method of claim 3, wherein a gap between the rollers is between approximately 0.1 and approximately 0.5 mm.

5. The method of claim 4, wherein the gap between the rollers is between approximately 0.1 and approximately 0.15 mm.

6. The method of claim 3, wherein the mixture is placed through the moving rollers of the roll mill six times successively.

7. The method of claim 1, wherein crushing the mixture of waste rubber crumb and modifier involves placing said mixture into an area between moving rollers of a roll mill between three and ten times successively.

8. The method of claim 7, wherein a gap between the rollers is between approximately 0.1 and approximately 0.5 mm.

9. The method of claim 8, wherein the gap between the rollers is between approximately 0.1 and approximately 0.15 mm.

10. The method of claim 7, wherein the mixture is placed through the moving rollers of the roll mill six times successively.

11. The method of claim 1, wherein the organic acid to base ratio in said mixture is between approximately 4:1 to approximately 6:1.

12. The method of claim 1, wherein an organic acid to base ratio in said mixture is between approximately 3:1 to approximately 10:1.

13. The method of claim 3, wherein a linear speed of a slow roller is between approximately 3 m/min and approximately 5 m/min, and wherein a linear speed of a fast roller is between 5 m/min and approximately 10 m/min.

14. The method of claim 7, wherein a linear speed of a slow roller is between approximately 3 m/min and approximately 5 m/min, and wherein a linear speed of a fast roller is between 5 m/min and approximately 10 m/min.

15. The method of claim 1, wherein the vulcanized rubber wastes are crushed tire rubber having a maximum particle size of between approximately 0.5 to approximately 5 cm.

16. The method of claim 15, wherein the vulcanized rubber wastes are crushed tire rubber having a maximum particle size of between approximately 1 to approximately 2 cm.

17. The method of claim 1, wherein the colophony is wood resin.

18. A method of sorbing oil that is found in undesirable places, such as oil spills, comprising:
(A) making a porous oil sorbent by first adding a modifier to vulcanized rubber waste in a proportion of between approximately one and a half pounds to approximately two and a half pounds for each 100 pounds of vulcanized rubber waste, the modifier comprising a mixture in the following proportions by weight (i) a slightly water-soluble organic acid having a melting point of 70 degrees Centigrade or higher representing between approximately 70 percent and approximately 90 percent of the mixture, (ii) quinine group bases representing between approximately 9 and approximately 29 percent of the mixture and (iii) either colophony or a terpene representing between approximately three quarters and approximately 1 and a quarter percent of the mixture, to obtain a mixture of rubber crumb and modifier, then
crushing the mixture of rubber waste and modifier to create crushed modified rubber particles, and then
converting the crushed modified rubber particles into porous agglomerations of modified rubber, and
(B) applying the oil sorbent to the oil to sorb the oil.

19. The method of claim 18, wherein the modifier comprises a mixture in the following proportions by weight (i) a slightly water-soluble organic acid having a melting point of 70 degrees Centigrade or higher representing approximately 80% of the mixture, (ii) quinine group bases representing approximately 19% of the mixture and (iii) a colophony representing approximately 1% of the mixture.

20. The method of claim 19, wherein crushing the mixture of waste rubber crumb and modifier involves placing said mixture into an area between moving rollers of a roll mill between three and ten times successively.

21. The method of claim 20, wherein a gap between the rollers is between approximately 0.1 and approximately 0.5 mm.

22. The method of claim 21, wherein the gap between the rollers is between approximately 0.1 and approximately 0.15 mm.

23. The method of claim 20, wherein the mixture is placed through the moving rollers of the roll mill six times successively.

24. The method of claim 18, wherein crushing the mixture of waste rubber crumb and modifier involves placing said mixture into an area between moving rollers of a roll mill between three and ten times successively.

25. The method of claim 24, wherein a gap between the rollers is between approximately 0.1 and approximately 0.5 mm.

26. The method of claim 25, wherein the gap between the rollers is between approximately 0.1 and approximately 0.15 mm.

27. The method of claim 24, wherein the mixture is placed through the moving rollers of the roll mill six times successively.

28. The method of claim 20, wherein a linear speed of a slow roller is between approximately 3 m/min and approximately 5 m/min, and wherein a linear speed of a fast roller is between 5 m/min and approximately 10 m/min.

29. The method of claim 24, wherein a linear speed of a slow roller is between approximately 3 m/min and approximately 5 m/min, and wherein a linear speed of a fast roller is between 5 m/min and approximately 10 m/min.

30. The method of claim 18, wherein the vulcanized rubber wastes are crushed tire rubber having a maximum particle size of between approximately 0.5 to approximately 5 cm.

31. The method of claim 30, wherein the vulcanized rubber wastes are crushed tire rubber having a maximum particle size of between approximately 1 to approximately 2 cm.

32. The method of claim 18, wherein the organic acid to base ratio in said mixture is between approximately 4:1 to approximately 6:1.

33. The method of claim 18, wherein an organic acid to base ratio in said mixture is between approximately 3:1 to approximately 10:1.

34. The method of claim 18, wherein the colophony is wood resin.

35. The method of claim 1, wherein the crushed modified rubber particles are converted into porous agglomerations of modified rubber by being placed into an extruder and exposed to heat until the crushed modified rubber particles pop.

36. The method of claim 35, wherein the crushed modified rubber particles are converted into porous agglomerations of modified rubber by being placed into the extruder for between approximately 2 minutes and approximately 10 minutes where they are exposed to a temperature of between approximately 120 degrees Centigrade and approximately 150 degrees Centigrade.

37. The method of claim 18, wherein the crushed modified rubber particles are converted into porous agglomerations of modified rubber by being placed into an extruder and exposed to heat until the crushed modified rubber particles pop.

38. The method of claim 37, wherein the crushed modified rubber particles are converted into porous agglomerations of modified rubber by being placed into the extruder for between approximately 2 minutes and approximately 10 minutes where they are exposed to a temperature of between approximately 120 degrees Centigrade and approximately 150 degrees Centigrade.

* * * * *